Aug. 10, 1943.   C. A. LOVELL   2,326,663
ALTERNATING CURRENT GENERATOR
Filed May 14, 1941   2 Sheets-Sheet 1

INVENTOR
C. A. LOVELL
BY John A. Hall
ATTORNEY

Aug. 10, 1943.　　　C. A. LOVELL　　　2,326,663
ALTERNATING CURRENT GENERATOR
Filed May 14, 1941　　　2 Sheets-Sheet 2

INVENTOR
C. A. LOVELL
BY
ATTORNEY

Patented Aug. 10, 1943

2,326,663

UNITED STATES PATENT OFFICE 2,326,663

ALTERNATING CURRENT GENERATOR

Clarence A. Lovell, Maplewood, N. J., assignor to Bell Telephone Laboratories, Incorporated, New York, N. Y., a corporation of New York Application May 14, 1941, Serial No. 393,406

9 Claims. (Cl. 179—90)

This invention relates to signaling means and particularly to alternating current generators of the type used in telephones for generating alternating current dialing signals representing telephone station designations.

The object of the invention is to provide an efficient reed generator of small dimensions and an arrangement including such generator whereby automatic compensation for line loss in transmission of signals from such generator will be achieved.

The generator belongs in the class of reed generators in which a reed designed to have a particular natural period of vibration corresponding to the frequency of the alternating current needed for signal purposes is included in a magnetic circuit interlinked with a pick-up coil whereby when the reed is set into vibration by being plucked will through such vibration alter the conditions in such magnetic circuit and cause an alternating current to be induced in said pick-up coil. In such generators it is usual to employ a plurality of such reeds each of a different dimension whereby a plurality of alternating currents of different frequencies may be generated and which may be transmitted either singly or in combination and in permutation codes representing different telephone designations. Energy is supplied in the said magnetic circuit and when the polarizing flux thus supplied is modulated by the vibration of the reed the pick-up coil interlinked with the magnetic circuit has induced in it a given frequency alternating current.

Usually the reed generators used for these purposes are of what are known as the balanced type in which no flux threads the reeds while at rest. The magnetic circuit consists of one simple circuit comprising, essentially, a horseshoe magnet with a small air-gap between the poles. The reed passes through this air-gap. Therefore when the reed is set in vibration in effect another magnet circuit comprising two branches is set up each including the reed and one pole of the horseshoe magnet and the flux in these two branches changes as the reed vibrates. A winding about the reed acts as a pick-up coil and the terminals of this coil act as the terminals of the generator.

In accordance with the present invention an unbalanced generator is employed—one which has a simple magnetic circuit including the reed and a magnetic structure which acts as both the circuit for the steady polarizing flux and the circuit for the changing flux threading the pick-up coil. Such unbalanced type of generator is preferably used since the initial value of the flux through the reed is usually different from zero.

It is to be understood, however, that a balanced type of generator employing a separate polarizing winding interlinked with the simple magnetic circuit of the permanent magnet also comes within the scope of the present invention.

The object is to regulate the flux density which through the vibration of the reed measures or determines the output of the generator in inverse proportion to the line losses in transmission of the alternating current from said generator to the distant end of the line. If the line is short and therefore the direct current flowing over it is comparatively large, the output of the generator must be less than if the line is long and the direct current flowing over it is comparatively small.

This object may be achieved in a number of ways. Firstly, the magnetic circuit may be constructed of magnetic material having a low coefficient of hysteresis—such as annealed soft iron. In this case the pick-up coil will be so designed that with the current supplied over the longest line expected the flux set up in the magnetic circuit thereby will be at such a point on the curve drawn between permeability and flux density where this characteristic curve begins its downward slope. Stated otherwise, the current supplied over the longest line to be expected will bring the saturation of the magnetic circuit to that point on the BH curve for such magnetic circuit where the slope of the curve begins to decrease. Under these conditions more current, responsive to shorter lines will cause a decrease in permeability so that the resultant alternating current will be at a lower level.

Secondly, the magnetic circuit may be constructed of magnetic material having a high coefficient of hysteresis, such as a permanent magnet, and the pick-up coil may be poled to aid the steady flux supplied by such material. In this case the coil will be so constructed and arranged to set up a condition represented by a point on the permeability-flux density curve just at or beyond the point where this curve begins to take a downward slope when the coil is energized over the longest expected line. Thus where the generator is connected to a line where the greatest line loss in transmission of alternating current is expected the maximum alternating current will be generated.

Thirdly, a magnetic structure made up partly of permanent magnet material and partly of annealed soft iron may be used. These materials may be in the form of interspersed laminations. Again in this case the pick-up coil may be poled to aid the flux of the permanent magnet and the coil will be so designed that a point on the permeability-flux density curve is reached by the longest line to be encountered where the curve begins its downward slope.

Alternatively this generator may be worked on the rising part of the curve before the peak is reached. In this event a point on the curve should be reached just before the peak is reached by the shortest line to be encountered and the coil will be designed to oppose the magnetism of the permanent magnet so as to effectually reverse the trend of the curve.

Under any of the above methods, it is necessary that the resultant permeability-flux density curve have a downward slope between the condition created by connection to a long line and the condition created by connection to a short line. It is also an object to so proportion and arrange the elements of this system so that the electromotive force of the alternating current transmitted over the line and delivered at the far end thereof will be always the same regardless of the length of the line, although it is to be understood that compensation less than perfect also comes within the scope of the present invention.

A feature of the invention is a polarizing winding for the generator which may be the pick-up coil or a separate coil which will so alter the flux of the permanent magnet structure that with more current flowing in the line, the resultant flux will be less.

Another feature is an alternating current generator in which the field strength may vary inversely with the resistance of the line to which it may be connected.

Another feature of the invention is an alternating current generator whose magnetic circuit is so proportioned, constructed and arranged that it may be affected by the line current of a line to which it is connected in such manner that with equal modulation an electromotive force is produced sufficient to overcome the constants of the line and appear at the distant end thereof at a uniform value.

Other features will appear in the following description.

The drawings consist of two sheets having seven figures as follows.

Figure 7:
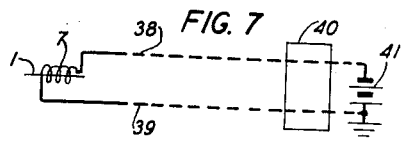
Fig. 7 is a schematic circuit diagram.
Figure 5:
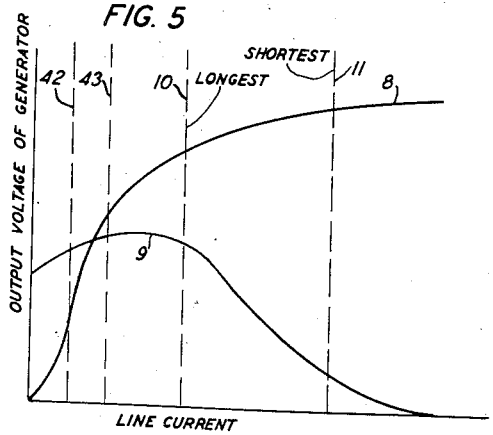
Fig. 5 is a pair of graphs showing the relationships existing in the magnetic circuit of the present generator. These graphs will be helpful in explaining the novel technical effect secured.
Figure 6:
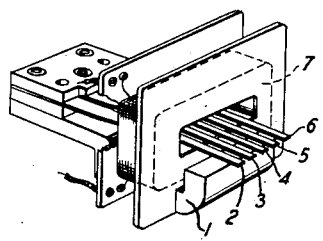
Fig. 6 is a perspective view of the essential part of the alternating current generator of the present invention.

The alternating current generator of the present invention consists of a magnetic circuit including an element 1 of magnetic material and a plurality of reeds 2, 3, 4, 5 and 6 each having a different natural period of vibration. A coil 7 is interlinked with this magnetic circuit since it is effectively wound about the reeds. When any one of the reeds is set in vibration an alternating current of the same frequency as the frequency of vibration of the reed is induced therein and delivered to the output terminals of the generator. The element 1 may be a permanent magnet or it may be of other magnetic material having a lesser coefficient of retentivity. In either case the coil 7 will be placed in the line circuit of a telephone line substation circuit and will accordingly serve to energize the said magnetic circuit in accordance with the value of the line current. This is shown in Fig. 7 where the connections between the coil 7, the lines 38 and 39 and the central office battery 41, extending through the central office circuits 40 are included in a schematic circuit diagram. The effect secured may be explained with the aid of the graphs of Fig. 5. The graph 8 is the well-known B and H curve showing the relation between flux density and magnetizing force. The curve 9 is a curve derived from the B and H curve and shows the relation between permeability and flux density, or translated into terms useful in the present case, shows the relation between the output voltage of the generator and the value of the current in the telephone line and in the coil 7. If now the coil 7 and the magnetic circuit of the generator are constructed and arranged so that the relations existing are between the values expressed by the lines 10 and 11, this generator will act to automatically compensate for the length of the line with which it is associated. The line 10 represents the longest telephone line to be used in commercial service. The line current is therefore comparatively small but the voltage generated by the generator is comparatively high. On the other hand the line 11 represents the short the telephone line to be used in commercial service. The line current is therefore comparatively large while the voltage generated by the generator is comparatively low. Thus on long lines the generator will generate additional values of electromotive force to overcome the additional length of line as measured in line resistance.

In some cases it may be found that the amount of line current available is sufficient to energize the magnetic circuit to the point on the B and H curve (at the point where it crosses the dotted line 10) where further energization by the increased current of the shorter lines bring about greater saturation without corresponding increase in the flux density. In other words graph 9 depicts the slop of graph 8, so that by working within the limits of the lines 10 and 11 automatic compensation may be achieved. In some cases this result may be had by making the magnetic part 1 in the form of a permanent magnet.

It will also be understood that by using a permanent magnet in the magnetic circuit and by working in another range, say between the lines 42 and 43 and by poling the coil 7 to oppose the flux of the permanent magnet, the same general result may be attained. In this case the shortest line carrying the greatest line current will reduce the total flux density of the magnetic circuit to a greater degree than the longest line carrying the least line current. Hence the voltage at the terminals of the generator will be higher for the long lines and lower for the short lines. With proper engineering design this effect may be matched to the expected line losses so that regardless of the length of the line and without any adjustment upon installation of a substation device, the received alternating current at the distant (central office) end of the line will be uniform.

The manner in which the reeds of this generator are plucked may be seen from Figs. 1 to 4. Here the generator of the present invention is shown as it would be incorporated in a telephone handset cradle. A group of ten digit push buttons 21 to 30 are provided for the use of the subscriber for calling purposes. Each button operates a lever such as 17 on which the button 26 is mounted. These levers are all pivoted on the shaft 19 and each has an arm such as 18 for rotating a commonly actuated U-shaped bar 31. Each lever is held in its normal position by an individual spring such as 20 as well as by the pressure of the common bar 31 which has a similar spring.

There are five U-shaped bars 12 to 16, inclusive, also pivoted on the shaft 19.

The lever 17 is provided with two lugs 32 and 33 which bear on the bars 12 and 14 respectively so that when the key 26 is depressed, the two bars 12 and 14 will be moved. Each lever has two such lugs but each will operate a different combination of the bars 12 to 16 so that these bars are operated in a permutation code by the push buttons 21 to 30.

Figure 1:
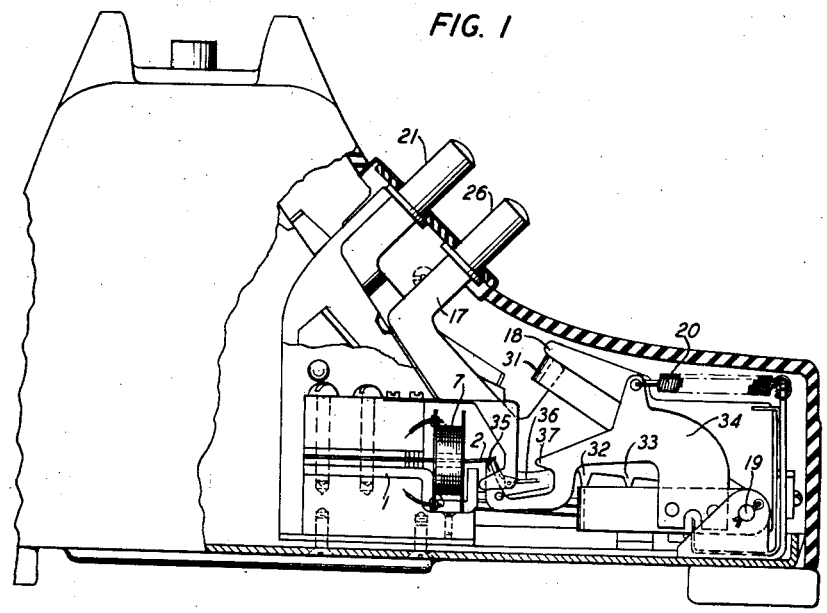
Fig. 1 is a side elevation partly in section showing the alternating current generator of the present invention incorporated in a telephone handset cradle and showing how the generator is operated.
Figure 2:
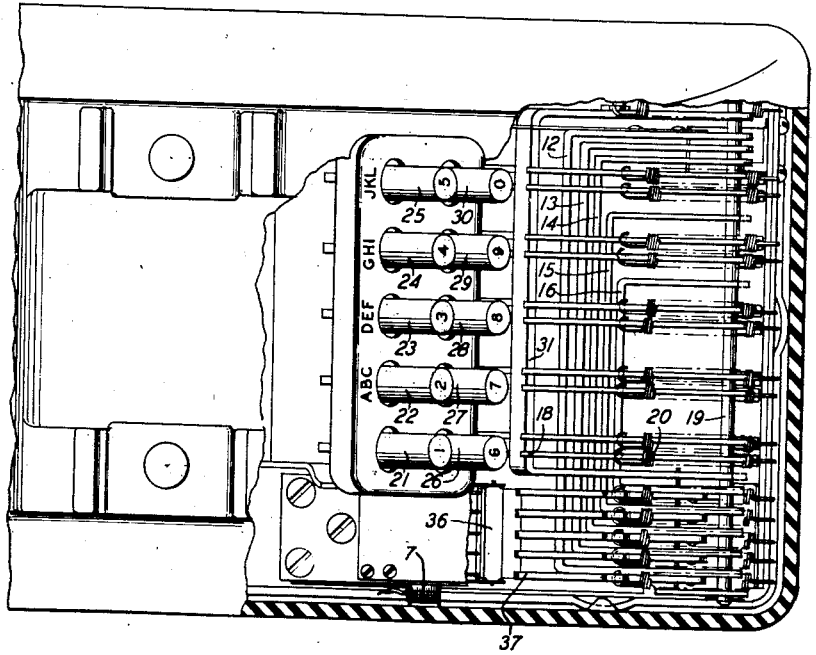
Fig. 2 is a plan of the same, partly in section.
Figure 3:
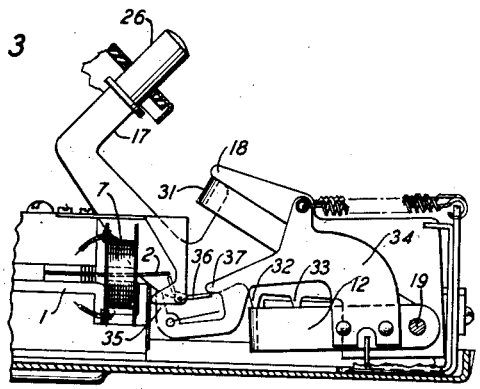
Fig. 3 is a fragmentary side view showing the action of the push button used for operating the alternating current generator and indicating the action just as the movement of the push button has been started.
Figure 4:
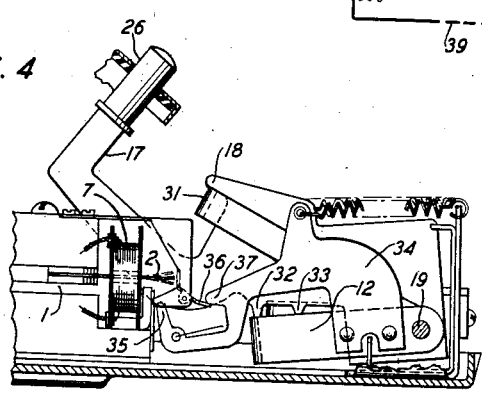
Fig. 4 is a similar fragmentary side view showing the relation of the various parts at the end of the movement of the push button and indicating the plucked reed of the generator as freely vibrating.

To each of the code bars there is secured a lever such as the lever 34 shown as riveted to the bar 12. The lever 34 terminates in a finger 35 which normally rests against the reed 5 and stresses it upwardly as shown in Fig. 1. When the lever 34 is rotated in a counter-clockwise direction, the finger 35 moves downwardly and allows the reed to come in contact with the upper edge of the pawl member 36. As the lever 34 continues its movement another finger 37 engages the pawl member 36 as shown in Fig. 3 and rotates it in a clockwise direction as shown. Thus the reed is set in vibration.

When the button 26 is released, the pawl member 36 rotates in a counter-clockwise direction under spring control and after the finger 35 has lifted the reed to nearly its extreme position, the pawl member 36 slips in under the end of the reed.

It is intended that this specification will cover other modifications of this device which come within the spirit of this invention and the scope of the following claims.

What is claimed is:

1. In a signaling system, a line, a source of current at one end of said line, an alternating current generator at the other end of said line, means for polarizing said generator over said line from said source of current, said generator including a magnetic circuit so constructed and arranged that the output of said generator delivered at the said one end of said line will be at a given level regardless of the electrical qualities of said line.

2. In a signaling system, a line, a source of current at one end of said line, an alternating current generator at the other end of said line, a polarizing winding for said generator connected over said line to said source of current, a magnetic circuit for said generator constructed and arranged so that the field strength of said generator will be an inverse function of the current flowing through said polarizing winding.

3. In a signaling system, a line having a resistance value within a given range, a source of current at one end of said line, an alternating current generator at the other end of said line, a polarizing winding for said generator connected over said line to said source of current, a magnetic circuit for said generator constructed and arranged so that the field strength will be greater when the said line is of maximum resistance and lesser when the said line is of minimum resistance in proportions to compensate for line loss in transmission of alternating current from said generator to a degree sufficient to cause a uniform delivery of said alternating current at said one end of said line regardless of the resistance value of said line over said given range.

4. In a signaling system, a line having a resistance value within a given range, a source of current at one end of said line, an alternating current generator at the other end of said line, a field winding for said generator connected over said line to said source of current, a magnetic circuit for said generator including a permanent magnet, said field winding arranged to oppose said permanent magnet, said permanent magnet and said field winding being constructed and arranged to provide a resultant field strength under different values of resistance of said line to control the output of said generator to automatically deliver a uniform alternating current output at the said one end of said line.

5. In a signaling system, a line having a resistance value within a given range, a source of current at one end of said line, an alternating current generator at the other end of said line, a field coil for said generator connected over said line to said source of current, a magnetic circuit for said generator, said field coil being proportioned and arranged to affect the said magnetic circuit when connected over lines within said range to fall within a decreasing portion of a curve for said magnetic circuit depicting the relation between permeability and flux density whereby the electromotive force generated by said generator will be substantially inversely proportional to the current flowing over said line from said source of current.

6. In a signaling system, a line having a resistance value within a given range, a source of current at one end of said line, an alternating current generator at the other end of said line, a field coil for said generator connected over said line to said source of current, a magnetic circuit for said generator including permanently magnetized material, said field coil being proportioned and arranged to affect the said magnetic circuit when connected over lines within said range to fall within a decreasing portion of a curve for said magnetic circuit depicting the relation between permeability and flux density whereby the electromotive force generated by said generator will be substantially inversely proportional to the current flowing over said line from said source of current.

7. In a signaling system, a line having a resistance value within a given range, a source of current at one end of said line, an alternating current generator at the other end of said line, a field coil for said generator connected over said line to said source of current, a magnetic circuit for said generator, said field coil being proportioned and arranged to affect the said magnetic circuit when connected over lines within said range to fall within decreasing values of the slope of the BH curve for said magnetic circuit whereby the electromotive force generated by said generator will vary for different lines in a sense and to a degree to automatically compensate for line losses introduced by said resistance.

8. In a signaling system, a line having a resistance value within a given range, a source of current at one end of said line, an alternating current generator at the other end of said line, a field coil for said generator connected over said line to said source of current, a magnetic circuit for said generator including permanently magnetized material, said field coil being proportioned and arranged to aid the said magnetic circuit when connected over lines within said range to operate within a portion of the BH curve for said magnetic circuit beginning with a point on such curve where the slope thereof begins to decrease when said generator is connected to a line having a maximum resistance within said range.

9. In a signaling system, a line having a resistance value within a given range, a source of current at one end of said line, an unbalanced alternating current generator having a simple magnetic circuit interlinked with a simple electrical circuit at the other end of said line, said electrical circuit deriving direct current energization from said source of current, said magnetic circuit and said electrical circuit being proportioned and arranged to operate within a portion of the BH curve of said magnetic circuit starting with a point of decreasing slope when said electrical circuit is connected to a line of maximum resistance within said range.

CLARENCE A. LOVELL.